ary, or Firm—Paul & Paul

United States Patent [19]
Beman et al.

[11] 4,153,432
[45] May 8, 1979

[54] APPARATUS AND METHOD FOR COLLECTION OF CONTAMINANTS

[75] Inventors: Donald K. Beman, New York; Edward A. Faccioli, Grandview; David B. Rimberg, Congers, all of N.Y.

[73] Assignee: Certain-teed Corporation, Valley Forge, Pa.

[21] Appl. No.: 783,224

[22] Filed: Mar. 31, 1977

[51] Int. Cl.$^2$ .................................... B01D 47/10
[52] U.S. Cl. ........................................ 55/90; 55/94; 55/96; 55/226; 55/227; 55/242; 55/254; 55/259; 55/344; 55/503; 261/DIG. 54
[58] Field of Search .................. 55/84, 94, 96, 226, 55/227, 242, 259, 493, 496, 501, 503, 508, 90, 344, 418, 415, 485, 7, 10, 107, 122; 210/445, 451; 261/DIG. 54, 117

[56] References Cited

U.S. PATENT DOCUMENTS

| | | | |
|---|---|---|---|
| 1,940,198 | 12/1933 | Wagner | 55/206 |
| 2,797,904 | 7/1957 | Voorhees | 261/DIG. 54 |
| 3,212,234 | 10/1965 | McMinn | 55/485 |
| 3,274,760 | 9/1966 | Sage | 55/259 |
| 3,280,540 | 10/1966 | Soltis | 55/493 |
| 3,339,344 | 9/1967 | Pallinger | 55/90 |
| 3,385,030 | 5/1968 | Letvin | 55/90 |
| 3,448,562 | 6/1969 | Wisting | 55/90 |
| 3,651,620 | 3/1972 | Lincoln | 261/117 |
| 3,729,898 | 5/1973 | Richardson | 55/122 |
| 3,803,805 | 4/1974 | Low | 261/117 |
| 3,856,487 | 12/1974 | Perez | 55/259 |
| 3,885,929 | 5/1975 | Lyon et al. | 55/259 |
| 3,971,642 | 7/1976 | Perez | 55/259 |
| 4,028,071 | 6/1977 | Lanlois | 55/92 |

FOREIGN PATENT DOCUMENTS

| | | | |
|---|---|---|---|
| 682149 | 9/1939 | Fed. Rep. of Germany | 261/DIG. 54 |
| 5689 of | 1901 | United Kingdom | 261/117 |
| 288883 | 8/1970 | U.S.S.R. | 55/227 |
| 385600 | 11/1973 | U.S.S.R. | 261/117 |

*Primary Examiner*—Frank W. Lutter
*Assistant Examiner*—David L. Lacey
*Attorney, Agent, or Firm*—Paul & Paul

[57] ABSTRACT

An apparatus and method are provided for controlling airborne contaminants, odors and plume opacities. The apparatus and method of the present invention controls airborne contaminants which are submicron in size or greater and which are contained in a gas stream in high number concentrations. Submicron aerosol emissions, odors, and plume opacities are controlled by subjecting the gas stream in which they are contained to staged pollution control system. The first stage or inline convergence tube module, nucleates micron and submicron airborne contaminants contained in the gas stream which is being moved through the first stage at about 2,500 feet per minute or greater by contacting the contaminants with countercurrent aerosol-liquor screens having a minimum generation velocity of at least 5,000 feet per minute. The second stage or modified venturi sump module collects some of the larger nucleated contaminant droplets from the first stage. The third stage or sump mist eliminator module collects remaining nucleated contaminant droplets and extraneous liquor droplet carryover by subjecting the gas stream to first and second filter media, wherein the underside of the first filter media is irrigated by cocurrent type spray and the top portion thereof is washed by countercurrent type spray, and thereafter, the gas stream as thusly treated is passed to the second filter media which collects entrained liquor carryover, all while maintaining the velocity of the gas stream through the third stage in the range of about from 480 to 630 feet per minute.

25 Claims, 9 Drawing Figures

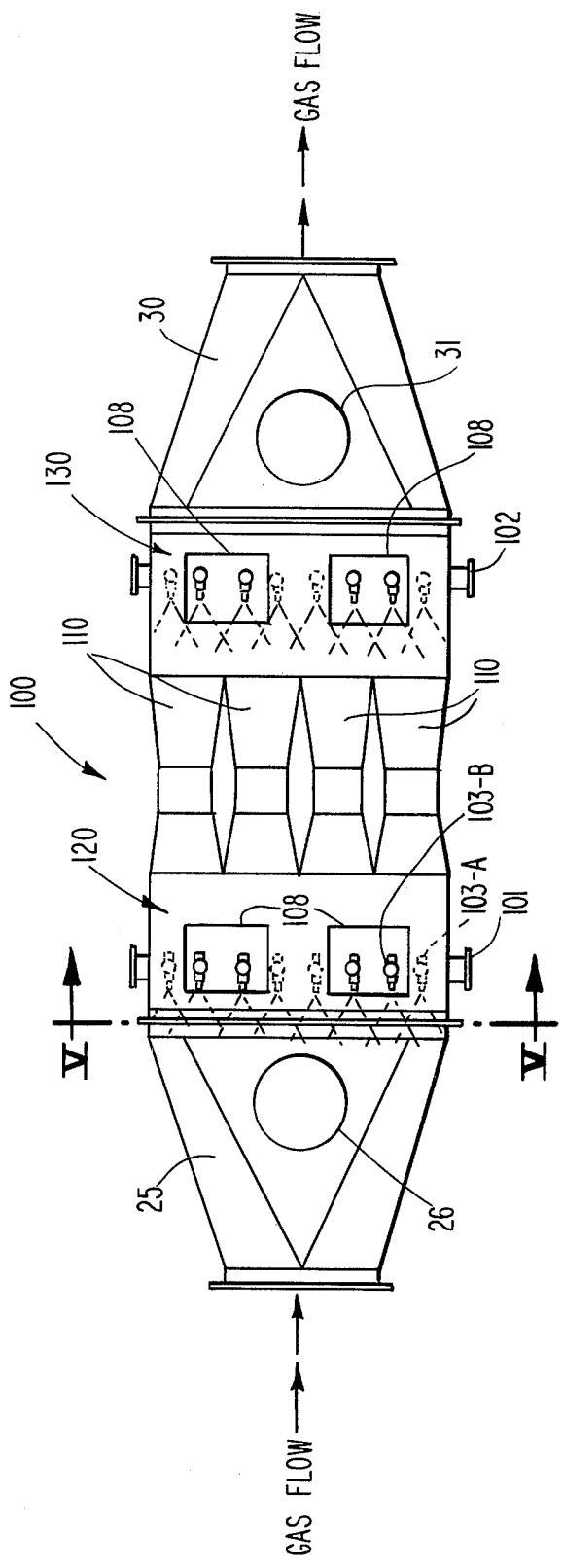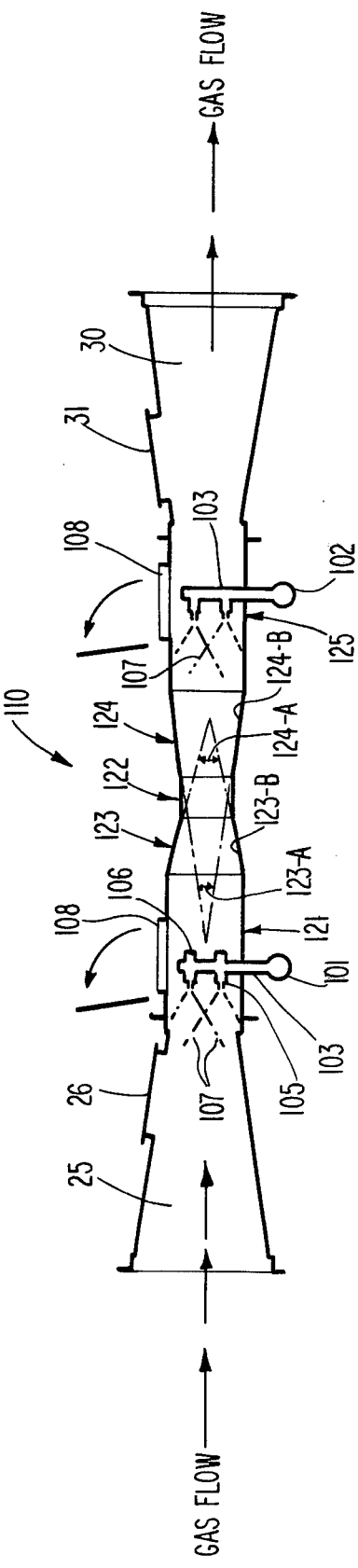

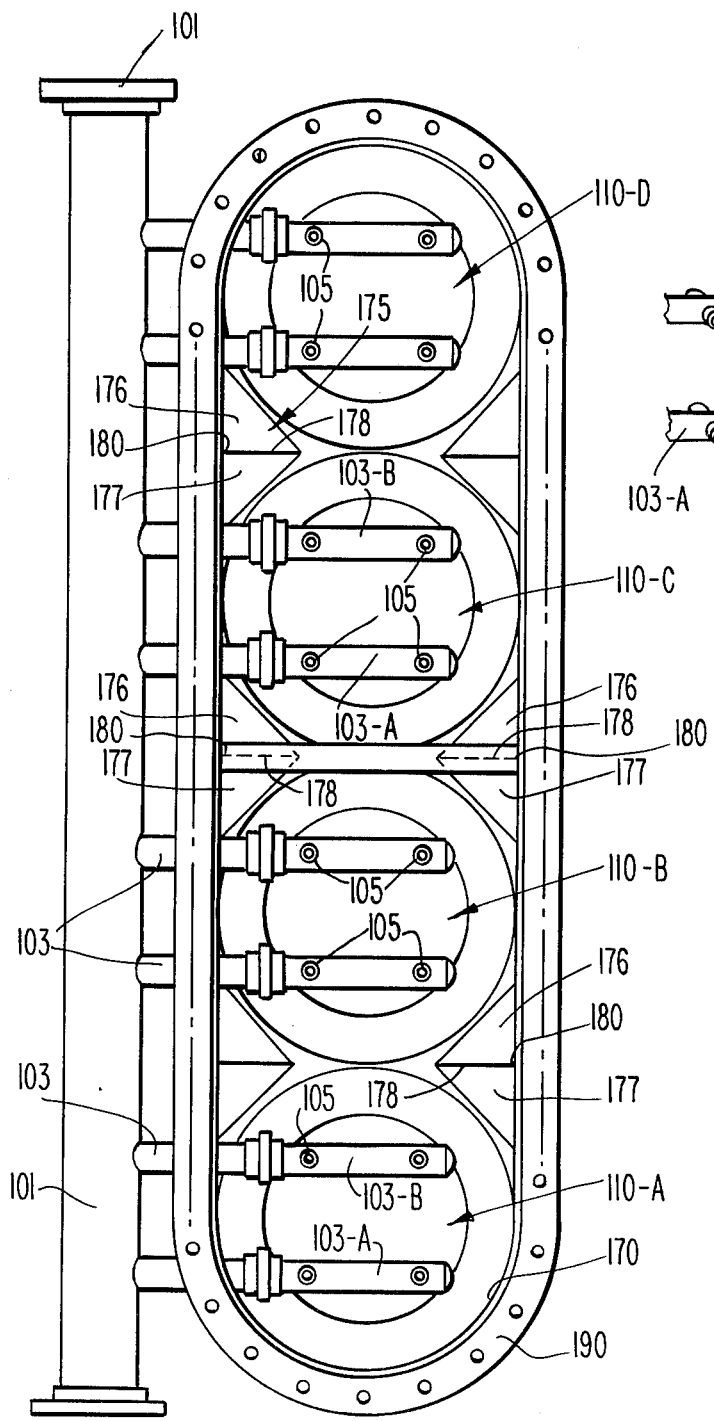
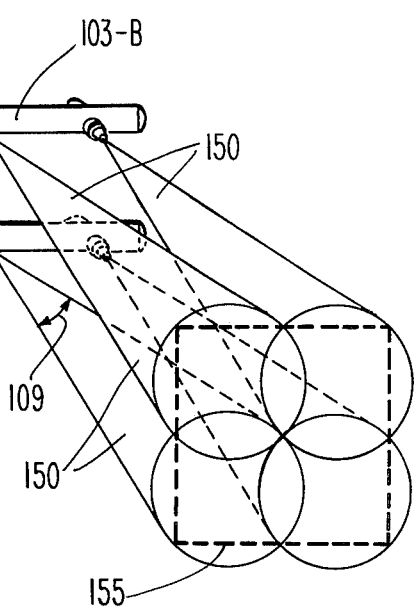
Fig. 6
Fig. 5

APPARATUS AND METHOD FOR COLLECTION OF CONTAMINANTS

BACKGROUND OF THE INVENTION

1. Field of the Invention

This invention relates generally to pollution control devices and methods, and more particularly, to an apparatus and method for the wet collection of submicron particulates and gaseous contaminants. Even more specifically, it relates to a pollution control system for treatment of contaminants emitted from the forming section during manufacture of fiberglass.

2. Description of the Prior Art

Gas streams which are exhausted from industrial processes usually contain airborne contaminants which must be removed prior to being discharged to the atmosphere. Gas cleaning devices utilize certain physical, chemical or electrical properties of the contaminants to remove them from the gas stream. Wet collectors, which are typically called scrubbers, use an aqueous medium in the separation process to remove particulate and gaseous matter. The liquid is passed through impingers, baffles, packing or sprayed, which attempts to create a high number concentration of droplets (i.e. spherical collectors) while attempting to present the airborne contaminant with a physical/chemical environment which promotes gas/mass transfer. The present invention is an improvement over the following patents, which typify the aforementioned collectors:

U.S. Pat. No. 3,336,733, W. L. Wisting
U.S. Pat. No. 3,406,498, W. L. Wisting
U.S. Pat. No. 3,448,562, W. L. Wisting
U.S. Pat. No. 3,651,622, W. L. Wisting
U.S. Pat. No. 3,856,487, Manuel Perez
U.S. Pat. No. 3,971,642, Manuel Perez The existing type technology either specifically disclaims removal of submicron contaminant particles, utilizes impingers, which include undesirable moving parts such as fans and fan blades, and/or are venturi type scrubbers which are undesirable since they usually include moveable baffles, are one stage and permit contaminant to be emitted, or are inefficient regarding collection of submicron contaminants and create relatively high pressure drops across the systems.

Today, many industrial processes exist in which the emissions to the ambient are of submicron size (in the order of 0.5 microns or less), with high number concentrations (in the order of $10^{12}$ particles per cubic foot), and contain odorous constituents which are not easily controlled by existing technology. Accordingly, apparatus and methods are needed to contain those submicron aerosol emissions, odors, and plume opacities which were previously considered extremely difficult, if not impossible, to control.

THE PRESENT INVENTION

The present invention is directed to providing apparatus and methods that utilize an improved inline convergence tube assembly (hereinafter referred to as "ICT Module") to interact with and nucleate airborne contaminant, a modified venturi sump (hereinafter referred to as "MVS Module")for elimination and removal of large droplets nucleated upstream in the ICT and which additionally functions as a liquid reservoir to feed various wet collection systems throughout the apparatus, and a sump mist eliminator (hereinafter referred to as "SME Module") comprising a media which is continuously cleaned and washed by a series of cocurrent and countercurrent sprays which remove smaller nucleated particulate, remaining gaseous contaminant, and extraneous droplet carryover from the gas stream. This gas stream is drawn through the above assemblies and subsequently passed to the atmosphere. Additionally, in certain applications dealing with hazardous materials, valuable product or extremely high number count streams, an additional assembly is provided subsequent to the above assemblies for containment of extraneous submicron aerosol.

Accordingly, it is a primary object of this invention to provide an apparatus and method for controlling submicron aerosol emissions, odors and plume opacities.

It is another object of the present invention to provide a staged apparatus and method for collecting airborne contaminants in a gas stream comprising both submicron and micron size particulate contaminant and gaseous contaminant.

It is a further object of this invention to provide a novel inline convergence module which effectively interacts with and nucleates submicron airborne contaminants.

It is still a further object of this invention to provide a novel SME module assembly which collects nucleated contaminants, gaseous contaminants and entrained liquor carryover, from the gas stream.

It is still a further object of the present invention to provide an efficient economical pollution control system having relatively small pressure drops throughout the system.

It is still another object of the present invention to provide a novel system for treatment of contaminants emitted from the forming section during manufacture of fiberglass.

Other objects and advantages of the present invention will be readily apparent to those skilled in the art from a reading of the following brief descriptions of the drawing figures, the detailed description of the preferred embodiment, and the appended claims.

BRIEF DESCRIPTION OF THE DRAWINGS

In the drawings:

FIG. 1 is a side elevation in perspective of the pollution control system of the present invention;

FIG. 2 is a plan view of the pollution control system of FIG. 1;

FIG. 3 is a plan view of the "ICT Module" of the pollution control system in FIGS. 1 and 2;

FIG. 4 is a longitudinal sectional view of one of the inline convergence tubes shown in FIG. 3;

FIG. 5 is a sectional view taken along the lines V—V of FIG. 3;

FIG. 6 is a view in perspective of the high pressure aerosol solid conical screens formed by the nozzles of the present invention;

FIG. 7 is a diagrammatic view of the pollution control system of FIGS. 1 and 2;

FIG. 8 is a cutaway view of the "MVS Module" and "SME Module" rotated 90 degrees from the view as shown in FIG. 7;

FIG. 9 is a cutaway detail view of the mist eliminator module as shown in FIG. 7;

FIG. 10 is a view of the "ICT modules" as illustrated in FIG. 3, when placed in series;

FIG. 11 is a block diagram illustrating the pollution control system of FIGS. 1 and 2 when operated in conjunction with a fiberglass manufacturing apparatus.

DETAILED DESCRIPTION OF THE PREFERRED EMBODIMENTS

Figure 1:
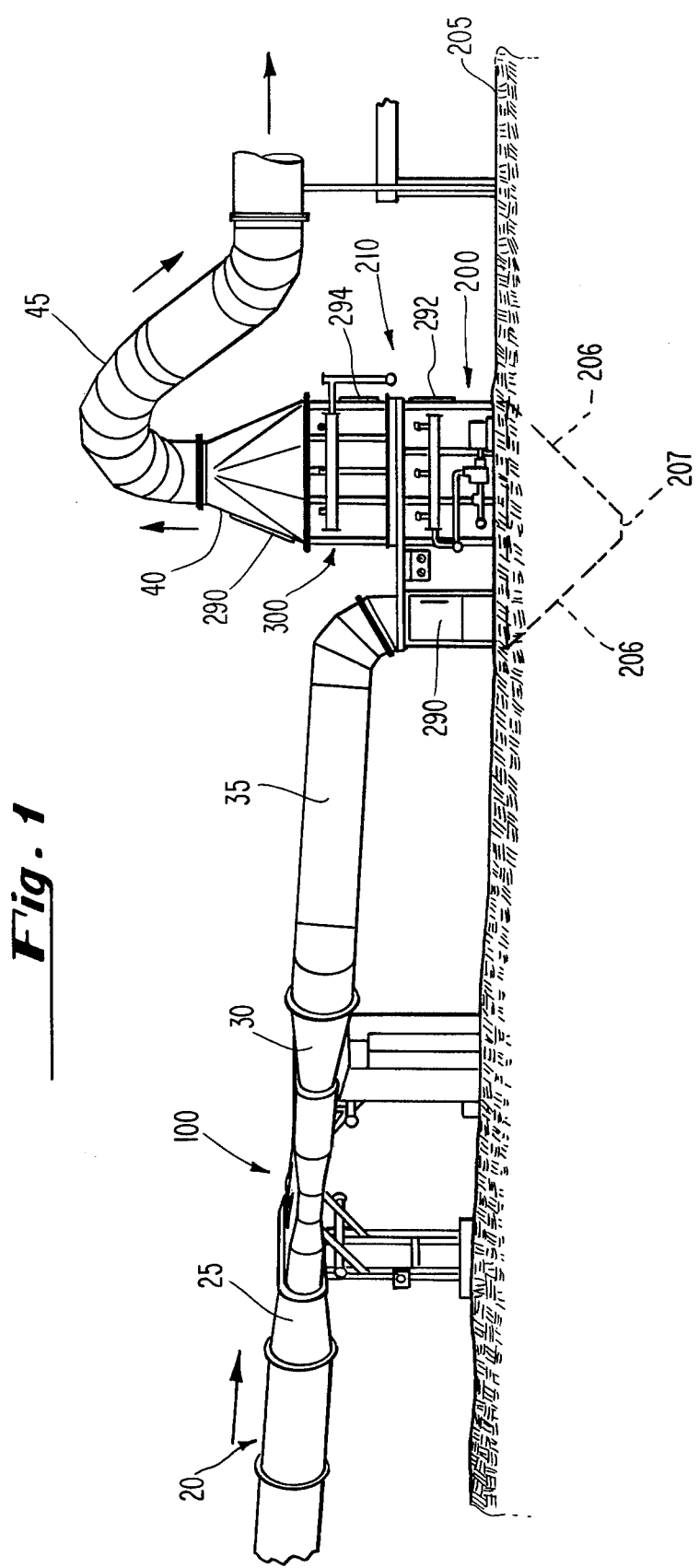

Referring now to FIG. 1 and FIG. 11 of the drawings, there is shown a pollution control system constructed in accordance with the teachings of the present invention. The pollution control system has a source conduit 20 which passes through a building wall (not shown) and may be adapted to be connected to a source of emmisions or be located in the vicinity of the source. In the preferred embodiment, the pollution control system treats airborne contaminants emitted from the forming section 5, of the fiberglass manufacturing apparatus 1, during the manufacture of fiberglass wherein the airborne contaminants from the source are drawn into source duct 20 which communicates with necked manifold 25 which communicates with ICT module 100. The airborne contaminants which are being drawn through ICT module 100 are then contacted with a countercurrent highly concentrated fine droplet spray of liquor. The contaminants as thusly treated are collected by mechanical-chemical forces supplied by said aqueous liquor environment of highly concentrated fine droplet spray, the apparatus for the process of which is more fully described hereinafter. ICT module 100 communicates with necked manifold 30 which communicates with conduit 35 which communicates with MVS module 200. The ICT module treated gas stream passes through MVS module 200 which eliminates and removes large droplets generated upstream in ICT module 100 and also functions as a liquor reservoir. MVS module 200 communicates with SME module 300 which contains lower mist eliminator media 320 (shown in FIG. 7, hereinafter referred to as "lower MEM"), and upper mist eliminator media 340 (shown in FIG. 7, hereinafter referred to as "upper MEM"). Lower MEM 320 removes extraneous droplet carryover from MVS module 200 and provides a packed bed type chemical and mechanical action resulting in removal of additional contaminants. The remaining fine droplet spray passing through lower MEM 320 is subsequently removed by upper MEM 340 after which the emerging gas stream passes through necked manifold 40 into conduit 45; necked manifold 40 communicating with SME module 300 and conduit 45. Conduit 45 communicates with forming fan 50 which draws the gas stream from the source, through the pollution control system, through the stack (not shown), and finally discharges it into the atmosphere where the gas stream has appreciably reduced contaminants. Although the pollution control system of the present invention will be described with reference to removal of airborne contaminants emitted from the forming section during the manufacture of fiberglass, it will be understood that it may be employed to remove pollutants or other undesirable contaminants from any gas. Accordingly, source duct 20 may, for example, be connected to, or be disposed in the vicinity of waste gas output from a chemical process which is subsequently treated and vented to the atmosphere. The above described conduit, manifolds, modules and stacking arrangements, should preferably be constructed of a material which will not chemically react with the pollutants in the air or gas being treated. Accordingly, the aforementioned structure and the hereinafter described interior parts of the pollution control system may be constructed, for example, of a mild steel, stainless steel, a glass fiber material, a plastic such as polyvinylchloride, or chlorinated polyvinylchloride, or concrete, and the like.

In a mat forming fiberglass insulation line, molten glass is fed into a forehearth and subsequently into bushings which form a veil of glass. The veil of glass is treated by passing it through quenching sprays and binder sprays, the latter of which sprays a resin onto the hot glass fibers.

A forming fan helps draw the fibers downwardly, and concomitantly forms a gas stream which was heretofore passed to the atmosphere. The binder resin is generally a phenol formaldehyde type resin which includes a mineral oil for conditioning the glass. In spraying the binder onto the glass, certain particulate contaminant and gaseous contaminant are produced which provide a primary source of pollutants. These airborne contaminants are contained in the gas stream being drawn by the forming fan. The airborne contaminants in the gas stream are believed to include phenols, urea, formaldehyde, oils, phenol formaldehyde, inorganics, related combustion by-products, and hydrocarbons. While the mass emission rates of the contaminant are not excessively high, it has been found that they are approximately 0.1 grains per dry standard cubic foot, which under current standards, is out of compliance with air pollution regulations. The size distribution of the particulate contaminant, however, is extremely small, and it has been found that approximately 75 percent, or more, by mass, is 0.50 microns or smaller. Therefore, the fiberglass forming line is faced with the compound problem of controlling mass emissions and high number concentrations of fine particle contaminant streams.

The present invention provides an apparatus and method in which submicron airborne contaminant emissions, as characterized above, can be abated. It will be understood that the gas stream contains airborne contaminants which are particulate contaminants and gaseous contaminants, and that different abatement mechanisms are required to collect and/or remove the above two respective types of contaminants from the gas stream.

While it has been found that the apparatus and methods of the present invention efficiently nucleate submicron contaminants, and while certain mechanisms, which are believed to be responsible for such collection are set forth hereinafter, it will be understood that they are set forth only to help explain the phenomena of "nucleation," the results of which have already been confirmed.

In the treatment of submicron particulate contaminant, the mechanisms of condensation, turbulent diffusion, coagulation, and diffusiophoresis are believed to be significant. On the other hand, the treatment of gaseous contaminant is believed to be effected by diffusion mechanisms and mass transfer, to provide a suitable absorption medium. The parameters believed to control gas absorption are the degree of solubility or chemical reactivity of the gaseous contaminant and the means of obtaining intimate contact between the gaseous contaminant and a wet collection stream.

The terms "nucleation" or "nucleated contaminant," which are used throughout the specification and claims, encompass the mechanisms responsible for the ten to one-hundred fold shift in size of submicron particulate contaminants, which are initially in the order of 0.5 microns or less.

The mechanism of condensation relates to the deposition of liquor molecules on contaminants to form a film which effectively increases the size of contaminant to promote efficient collection. It is believed that high relative velocities, together with temperature gradients between the contaminant and the aerosol liquor droplets, promote the condensation type mechanism.

A turbulent diffusion type mechanism is believed to result from the turbulent wake created on the leeward side or side opposite the direction of travel (immediately after being generated by the countercurrent spray) of a rapidly moving aerosol liquor droplet which disturbs the path of the approaching submicron contaminant, and subsequently draws the contaminant onto the backside of aerosol liquor droplet. It is believed that the turbulent wake forms a microscopic vacuum in the leeward side of the aerosol liquor droplet which promotes the capture of the contaminant. To create a turbulent wake, a minimum velocity of the aerosol liquor droplet must be achieved and it is believed that the turbulent diffusion mechanism increases with increasing relative velocity up to a certain value at which point the submicron contaminant does not spend sufficient time in the region of the droplet and therefore translates into a decreased ability for collection.

Coagulation is the continuous change in number concentration and size distribution in a gas stream which arises from the relative velocities between contaminants and aerosol liquor droplets. The relative velocities may be due to Brownian motion differences, in particle sedimentation rates, electrostatic effects, or velocity gradients in laminar or turbulent flow. Brownian motion is the zig-gag motion of a submicron contaminant caused by irregular bombardment by the surrounding gas molecules; this motion allows contaminants to deviate from their stream line flow around an aerosol liquor droplet (or collector), thereby enhancing collection in the vicinity of the collecting obstacle. Electrostatic attraction occurs when the contaminant and collector are in close proximity and moving at low relative velocity; an electrostatic charge on the contaminant is usually induced during its generation, and an contaminants charge on the collector is usually induced by the shearing action in the nozzles to produce an aerosol liquor droplet spray—the attraction forces between collector and contaminant usually result in removal of the contaminant from the gas stream.

The diffusiophoresis mechanism is believed to account for significant submicron contaminant collection under proper gas stream conditions of temperature and vapor phase concentration. The term diffusiophoresis is meant to include both Stephan flow and momentum transfer which are both diffusion forces. Stephan flow is the hydrodynamic flow necessary to maintain a uniform pressure in a diffusing gaseous system when the total number of gas molecules has undergone a change, such as a phase change. The direction of Stephan flow force is towards a condensing droplet which results in the submicron contaminant being deposited on the aerosol liquor droplet. The momentum transfer force arises from the effect of unequal molecular weights between the gases and vapors which also results in particle deposition onto the condensing droplet collector. It is therefore believed that the overall effect of diffusiophoresis in the proximity of a condensing aerosol liquor droplet, is the accumulation of submicron contaminants from the gas stream.

THE ICT MODULE

Figure 2:
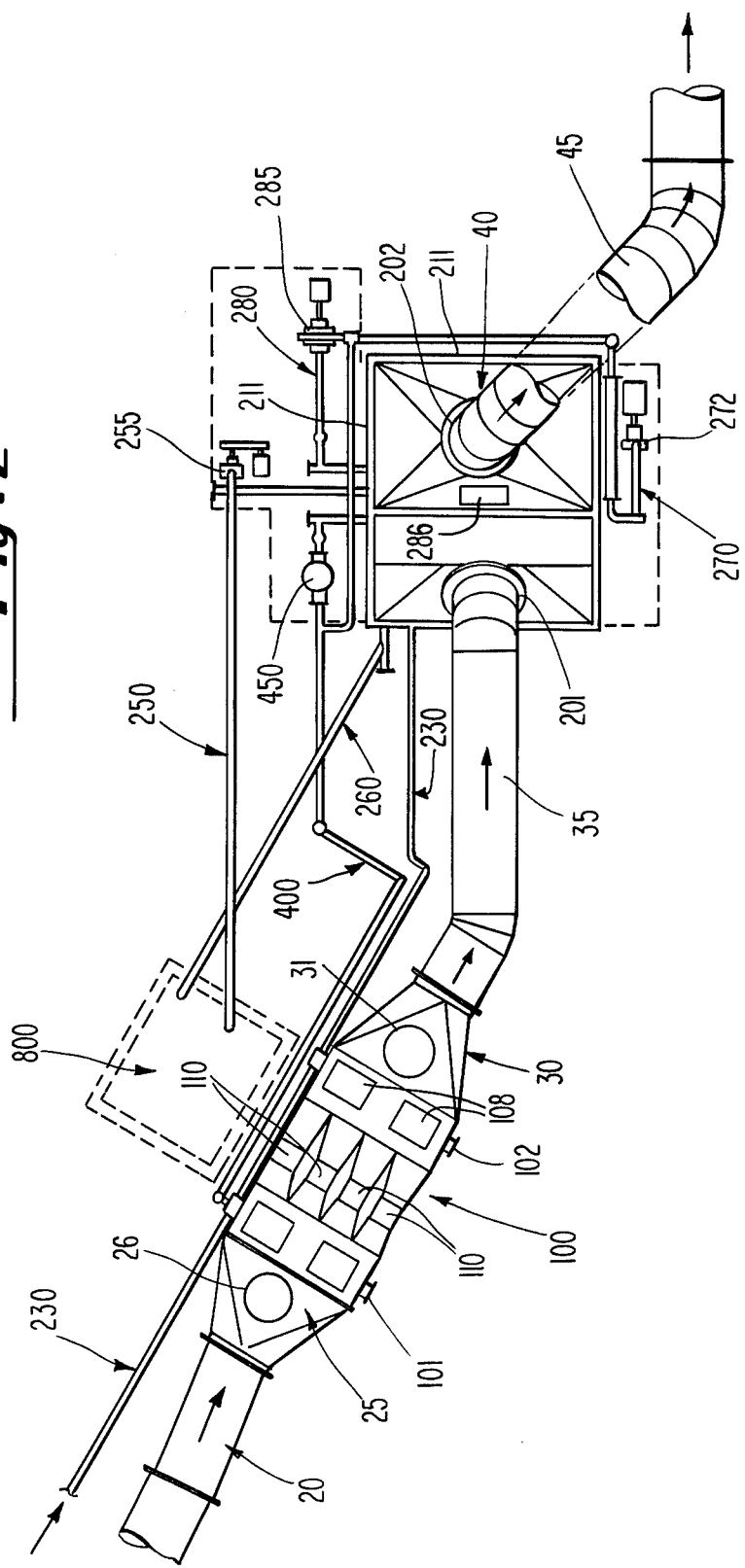

ICT Module 100 is comprised of four individual ICT units designated generally as ICT 110 (FIGS. 1, 2 and 3). ICT module 100 communicates with necked manifold 25 which has inspection manway 26 to provide access to necked manifold 25 which provides an inlet transition for a gas stream being drawn through ICT module 100. ICT module 100 also communicates with necked manifold 30 which has inspection manway 31 to provide access to necked manifold 30 which provides an outlet transition through which the gas stream is drawn from ICT module 100. Referring now to FIGS. 3 and 4, ICT module 100 is shown as having four separate ICT unit(s) 110 functioning in parallel, each treating one-fourth of the gas stream entering ICT module 100. ICT module 100 has primary nozzle feed manifold 101 and secondary nozzle feed manifold 102. Each nozzle feed manifold supplies liquor to eight nozzle feeds 103 which in turn supplies liquor to nozzle(s) 105 which provide an aerosol liquor spray countercurrent to the gas stream. In primary nozzle feed manifold 101, second nozzle(s) 106 are positioned to provide a spray cocurrent to the gas stream; in the preferred embodiment nozzle(s) 106 are capped.

In the preferred embodiment, each of the four ICT module unit(s) 110 communicate with each other to form integral ICT module 100 (FIGS. 3 and 5). ICT module 100 has four access hatches 108 which provide a means to enter primary section 120, secondary section 130, and gains access to nozzle(s) 105.

Referring now to FIG. 4, ICT module unit 110 has two nozzle feed(s) 103, providing four solid cone aerosol liquor sprays 150 (FIG. 6), which form a predetermined aerosol liquor generation population of the appropriate density, as more fully described hereinafter. ICT module unit 110 comprises inlet conduit portion 121 of generally cylindrical configuration and a second conduit portion 122, also of generally cylindrical configuration, but of reduced diameter with respect to inlet conduit portion 121. Interposed between inlet conduit portion 121 and second conduit portion 122 is a third conduit portion 123 of generally frusto-conical shape. Two sets of spray feeds 103 are positioned axially within inlet duct portion 121 and arranged to emit a solid conical spray or screen of aerosol liquor indicated by the dash lines 107. Disposed downstream of second conduit portion 122 is a second frustoconical portion designated as fifth conduit portion 124. It will be understood that the conduit portions downstream of portion 122 could be made of the same diameter as portion 122, however, to allow room for nozzles 105 of secondary nozzle feed manifold 102, fourth conduit portion 125 is made of the same diameter as inlet conduit portion 121. Nozzles 105 of secondary nozzle feed manifold 102, emit a solid conical spray of aerosol liquor indicated by dash line 107 in the same manner as indicated with respect to primary nozzle feed manifold 101.

In operation of the device, as thusfar described, the gas stream to be cleaned is drawn by the forming fan through source duct 20 into necked manifold 25 and then into ICT module 100. Necked manifold 25 is constructed to adjust the velocity of the gas stream and to cooperate with ICT module 100 so that the gas stream enters primary section 120 at a predetermined velocity. The gas stream is then contacts with an aerosol screen of a highly concentrated fine droplet spray 107 of liquor which is maintained within the predetermined velocity range. In accordance with the present invention, the predetermined velocity of the gas stream and therefore, the airborne contaminant contained therein, is in the range of about 2,500 to 5,000 feet per minute. The predetermined velocity is a function of environmental conditions such as temperature, pressure, and the like, the construction of the conduit upstream of ICT module 100, together with the cubic feet per minute (hereinafter referred to as "CFM") of gas stream being drawn through the conduit by the forming fan. As previously set forth, the particulate contaminant size distribution is extremely small and has been characterized as comprising 75 percent or more, by mass, of an aerodynamic particle size distribution of 0.5 microns or smaller. The particulate contaminant number concentration has been found to be in the range of $10^{11}$ to $10^{12}$ particles per cubic foot. In accordance with the invention, a high pressure aerosol screen of highly concentrated fine droplets of spray are reacted with the airborne contaminant. To maximize the nucleation mechanism for contaminant growth, it has been found that the liquor droplet size distribution by number count should be within the range of 50 to 400 microns and optimally around 200 microns. In the preferred embodiment the population of fine droplets known as the liquor generation rate is in the range of about $10^{11}$ to $10^{13}$ droplets per minute and the density of the high pressure aerosol screen known as the aerosol flux, is in the range of about $10^{11}$ to $10^{13}$ droplets per minute per square foot.

The liquor used to produce the high pressure aerosol screen may be an aqueous solution which is selected from those known in the art depending upon the particular airborne contaminant and desired emissions control to be ultimately achieved. Heretofore, a standard liquor would consist of water with neutralizing agents or other additives for treatment of acidic and caustic gases, and would not contain suspended solids. In accordance with the present invention, the wash water from the fiberglass making process is applied to sump portion 220 of MVS module 200 by wash water feed pipe 230. It has been found that the wash water liquor, which contains suspended solids, promotes formation of fine liquor droplets utilized in the aerosol screens of the present invention. The preferred range of suspended solids in the liquor is from about 0.2 to 2 percent. The suspended solids in the liquor tend to reduce the surface tension of the droplets which accordingly reduce the size of the droplet. The relationship between suspended solids and liquor droplets size has been found to be relatively proportional; namely, that an increase in the percentage of suspended solids in the liquor, will decrease the surface tensions of a droplet which promotes formation of smaller droplets in proportion to the decrease in surface tension. In selecting the range of suspended solids in the liquor, it will be understood that as the percentage of suspended solids in the liquor increases, the counterproductive affect of resuspending the solids in the gas stream increases.

Figure 7:
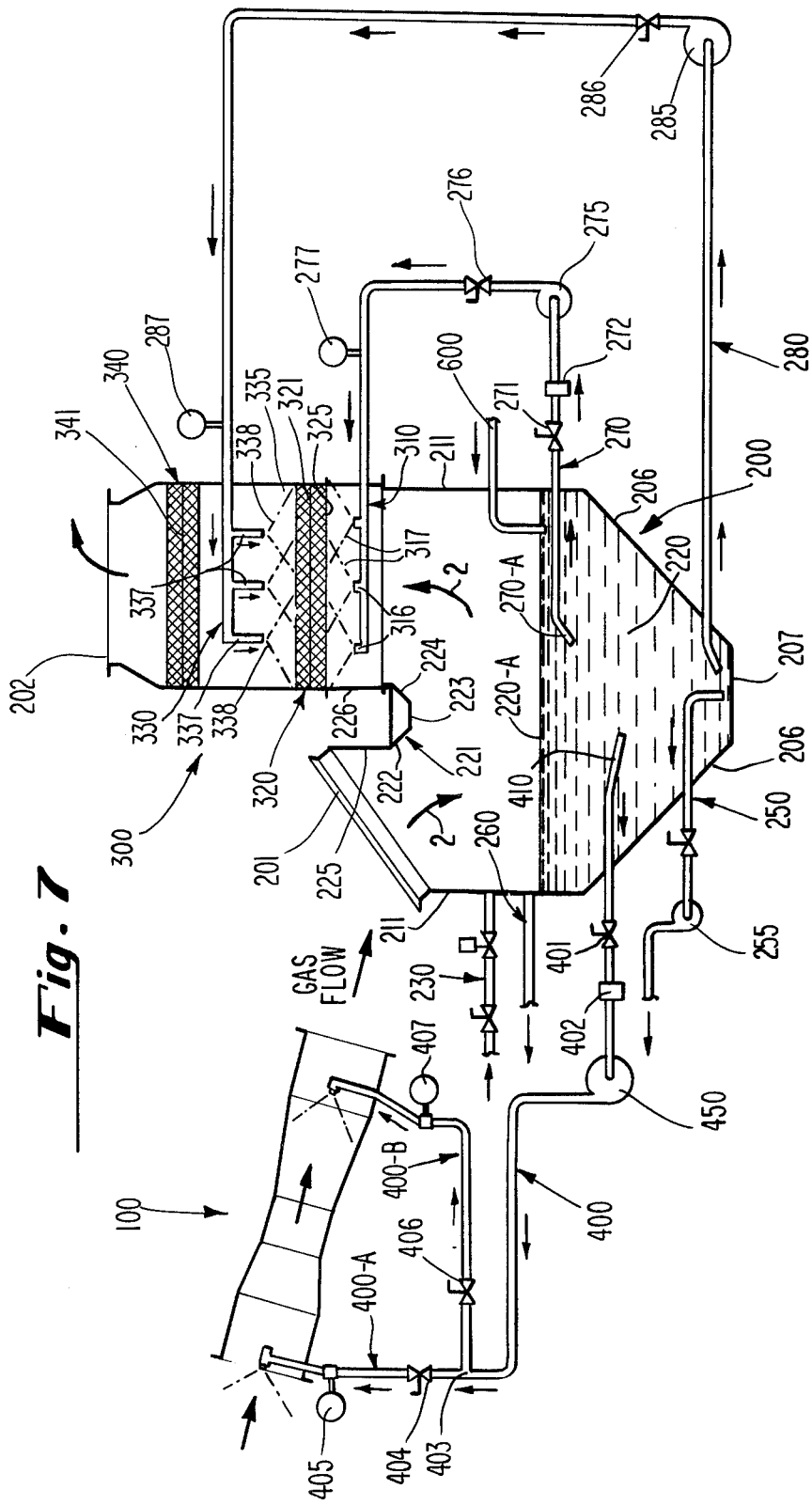

Referring now to FIG. 7, it can be seen that feeder line 400 has a first end portion 410 located in sump 220 of MVS module 200, below liquor surface 220-A. The liquor is drawn into feeder line 400 through valve 401 and through strainer 402 by pump 450. Pump 450 is a high pressure pump which in the preferred embodiment is operated to create a pressure head hereinafter referred to as an aerosol generation pressure, in the range of about 280 to 400 p.s.i. Feeder line 400 then passes through pump 450 which pumps the liquor through T-section 403; feeder line 400 branching into feeder line 400-A and feeder line 400-B. Feeder line 400-A then passes through valve 404, through pressure gauge 405 and feeds primary nozzle feed manifold 101. Feeder line 400-B passes through valve 406 then through pressure gauge 407 feeding secondary nozzle feed manifold 102.

In the preferred embodiment, nozzles 105 produce a stable full cone spray pattern with the widest possible spray angle. The wide angle spray is desirable since under high pressure, the aerosol screen is desired to produce a high concentration fine droplet spray, as defined above, to present a reacting spray of the desired flux to the entire gas stream. It will be understood that the higher liquor pressure being fed to nozzles 105 will translate into a smaller unit area of coverage having the desired aerosol flux. At the above aerosol generation pressures, it is believed that spray angle 109 is approximately 60°, as shown in FIG. 6. Referring now to FIGS. 4 and 6, nozzle feeds 103-A and 103-B provide four nozzle(s) 105 for ICT module 110.

In FIG. 6, the solid cones of liquor droplet spray 150 are shown to overlap; the area defined by the cones within dashed lines 155 produces the minimum aerosol flux which is suitable for interacting with the airborne contaminants. Referring now to FIG. 5 and particularly to ICT unit 110-A, wherein nozzle(s) 105 produce a high pressure aerosol screen which projects outwardly from the plane of the drawing, it will be understood that a conical screen 150 of the minimum aerosol flux, must interact with that portion of the gas stream entering each ICT unit 110. Therefore, cones of a certain minimum flux, produced by ICT module units 110 A, B, C, and D must optimally produce a screen defined by the inside walls of ICT module 100. Flange 190 mates with an opposed flange (not shown) of necked manifold 25 to preferably form an air tight seal between necked manifold 25 and primary section 120 of ICYT module 100. Inside wall 170 conforms to the outer portions of ICT module(s) 110, as shown (FIG. 5). Wedge-like structures 175 are welded together forming sections 176 and 177 along line 178. Line 178 is flush with inside wall 170 at point 180; thereafter tending inwardly toward inlet portion 121 and inclining upwardly as shown. Wedge-like structures 175 function to aerodynamically funnel the gas stream into the four ICT unit(s) 100 and tends to abate any pressure drop created by the passage of the gas stream from necked manifold 25 into ICT module 100. The internal portion of necked manifold 30 as it abutts ICT module 100 is substantially as shown and described with respect to necked manifold 25, above.

In the preferred embodiment the liquor is pumped from reservoir 220 into primary nozzle feed manifold 101 generating an aerosol generation pressure in the range of about from 280 to 400 p.s.i. These pressures, in conjunction with nozzles 105 produce an aerosol screen of highly concentrated droplet spray at a certain velocity. This velocity hereinafter referred to as the aerosol generation velocity, represents the velocity of aerosol liquor upon emission from nozzle 105. It was determined that the aerosol generation velocity, under which conditions for collection of contaminants in ICT module 100 are maximized, are in the range of from about 5,000 to 15,000 feet per minute. In the preferred embodiment the aerosol generation pressure was about 300 p.s.i.; the aerosol generation velocity was derived from Bernoulli's Equation to be approximately 13,000 feet per minute, assuming that there would be little or no energy loss attributed to the aerosol liquors emergence from the nozzle orifice. It has been determined that there will be some energy loss associated with the above conditions, and in the most severe case, it is believed that the energy loss could amount to as much as 50 percent. In this instance the aerosol generation velocity would be about 6,500 feet per minute. Another factor to be considered in determining the appropriate range of aerosol generation velocities, is the fact that the aerosol generation pressure could drop somewhat to about 280 to 290 p.s.i. Still yet another consideration, is the fact that there is an upper aerosol generation velocity threshold which, if exceeded, would not permit sufficient interaction between the aerosol liquor droplets and the airborne contaminant.

Taking these factors into consideration, together with the preferred aerosol generation pressure ranges, it was determined that the aerosol generation velocities which would permit efficient collection mechanisms in accordance with the invention, would be in the range from about 5,000 to 15,000 feet per minute, with the optimal range being from about 6,500 to 13,000 feet per minute.

In operation of the invention as thusfar described, the gas stream enters ICT module 100 carrying airborne contaminant at a velocity in the range of about 2,500 to 5,000 feet per minute. A first liquor spray means, as described above, is arranged in inlet portion 121 and contacts an aerosol screen of droplets with the gas stream. The aerosol-liquor spray is directed countercurrent to the flow of the gas stream and has a minimum generation velocity of about 5,000 feet per minute with a maximum velocity of about 15,000 per minute. The nucleation mechanism created by the interacting aerosols is effectuated by the high relative velocity between the aerosol droplets and the airborne contaminant. The threshold relative velocities have been determined to be in the range of from about 7,500 to 20,000 feet per minute and optimally from 7,500 to 15,000 feet per minute. After interaction with the aerosol-liquor spray, the gas stream then passes through frustoconical section 123 which increases the velocity of the gas stream which passes into second portion 122. In second portion 122, the relative velocity between the airborne contaminant and the aerosol liquor droplets is maintained at a relatively low velocity, which in the preferred embodiment approaches a zero relative velocity.

The nucleation mechanisms affected in inlet portion 121, substantially shift the particulate contaminant size distribution of submicron particulate contaminants which initially entered ICT module 100. Moreover, both the particulate contaminant and the aerosol liquor droplets, the latter of which have been sheared by nozzles 105, now contain an electrostatic charge. Since the particulate contaminant and the aerosol liquor droplets pass through second portion 122 having a very small relative velocity, some electrostatic collection of the airborne contaminants occurs due to the attraction of the charged airborne contaminant by the charged aerosol liquor droplet collectors. In accordance with the present invention, and depending upon the nature of the airborne contaminant, the resultant gas stream from second portion 122 may be passed directly into the MVS module 200, without further ICT treatment. On the other hand, some contaminants require further nucleation to be provided to effect efficient collection of these emissions. In this instance, the gas stream from second portion 122, is passed into a second frustoconical section 124, which decreases the velocity of the gas stream, which in turn passes through fourth portion 125, where it is reacted with another bank of nozzles 105 being fed from secondary nozzle feed manifold 102, under the same conditions and parameters as set forth above with respect to nozzles 105 of primary nozzle feed manifold 101.

In the treatment of airborne contaminant produced in the manufacture of fiberglass, it was found that the operation of the device, as thusfar described, amply nucleated the airborne contaminants. In the preferred embodiment, four ICT module(s) 110 were arranged in parallel to form integrated ICT module 100. It was determined that the four ICT module(s) 110, operating in parallel, produced the appropriate gas stream velocities necessary for the nucleation mechanism. It was found that the nucleation mechanisms were most efficiently effected when the airborne contaminant velocity in inlet portion 121, was one-half the throat velocity in second portion 122. Moreover, it was found that the nucleation mechanisms were enhanced when frustoconical portion 123 contained an included angle 123-A (formed by projecting walls 124-B of frustoconical section 124 toward inlet portion 121) in the range of from 15 to 25 degrees and optimally 20 degrees; and frustoconical section 124 contained included angle 124-A (formed by the projection of walls 123-B toward fourth portion 125) in the range of from 5 to 15 degrees, and optimally 10 degrees.

It will be understood that the number of ICT module(s) 110 to be arranged in parallel, may vary in accordance with the volume of the gas stream being drawn through the system per time interval, the size of the feeding conduit, and the like. Moreover, if the nature of the contaminant is such that insufficient nucleation is achieved in ICT module 110 or the module containing such ICT modules in parallel (i.e. ICT module 100 a plurality of ICT module(s) 110 may be combined in series (see FIG. 10) or a plurality of ICT modules 100 in series, until sufficient nucleation of the airborne contaminant is achieved.

THE MVS MODULE

Referring now to FIGS. 1 and 7, MVS module 200 has a housing 210 which is a box-like structure above grade line 205 and which contains inwardly descending sides 206 in communication with bottom portion 207 to form sump 220 which contains liquor having sump liquor surface 220-A. MVS module 200 has two outwardly opening service doors. Door 290 for access to MVS module 200, and door 292 for servicing nozzles 316 which flush the upstream surface of first media means 320. Venturi portion 221 has a fixed portion having three sections 222, 223, and 224 which extend from central inlet wall 225 to central outlet wall 226. Each of the sections may comprise a planar section which is connected between housing walls 211. Central section 223 is disposed substantially parallel to sump liquor surface 220-A. Section 222 is an inlet section disposed at an acute angle with respect to the plane of the central section and is located on the upstream side of central section 223. Section 224 is an outlet section which is similarly disposed on the downstream side of central section 223.

Accordingly, when the gas stream is drawn into MVS module 200, venturi portion 221 cooperates with sump liquor surface 220-A to define a passageway for said gas stream as indicated by the arrows 2 in FIG. 7.

In operation of the device, as thusfar described, the ICT treated gas stream has been nucleated and includes large and small nucleated contaminants, gaseous contaminants, and entrained liquor carryover. As the gas stream passes through MVS module 200 the above defined passageway causes a bend in the gas stream and the large nucleated contaminants are collected by liquor filled sump 220, since the force of gravity causes the large nucleated contaminants to fall from the gas stream and settle on sump liquor surface 220-A.

The collected contaminants settle to bottom portion 207 of housing 210 and are drawn from liquor filled sump 220 by suction intake line 250 by pump 255. The contaminant liquor is discharged into wash water collection pit 800 (FIG. 2). Overflow pipe 260 provides a gravity overflow to maintain proper height of sump liquor surface 220-A and also empties into wash water collection pit 800. Feeder system 270 has a suction intake line 270-A located about three feet below sump liquor surface 220-A, near the center of liquor filled sump 220. Feeder system 270 draws liquor from liquor filled sump 220 through valve 271 into strainer 272 and into pump 275. Pump 275 operates at around 100 gallons per minute and provides the suction to draw liquor through feeder system 270 at approximately 40 p.s.i. The liquor then passes through valve 276 and through pressure gauge 277, feeding lower MEM manifold 310. Feeder system 280 draws liquor from liquor filled sump 220 by pump 285 which is a high flow low pressure pump operating around 400 gallons per minute at around 15 p.s.i. Liquor is drawn through pump 285 of feeder system 280 and passes through valve 286 to pressure gauge 287 feeding upper MEM manifold 330.

MVS module 200, not only acts as a reservoir for the liquor which is fed to the various wet collection systems, but also acts as a reservoir for the liquor which is the byproduct of the wet collection operations. For example, in the preferred embodiment, the wet collection system in ICT module 100 is drained through ICT module 100 into necked manifold 30 and into conduit 35 which communicates with inlet 201 of MVS module 200. As is best seen in FIG. 1, the pollution control system of the present invention slopes downwardly from ICT module 100 to inlet 201 which provides a gravity drain for the liquor to flow into liquor filled sump 220. Moreover, liquor gravity drain feed 600 is provided to drain any built up condensation from the fan and stack (not shown).

THE SME MODULE

Figure 8:
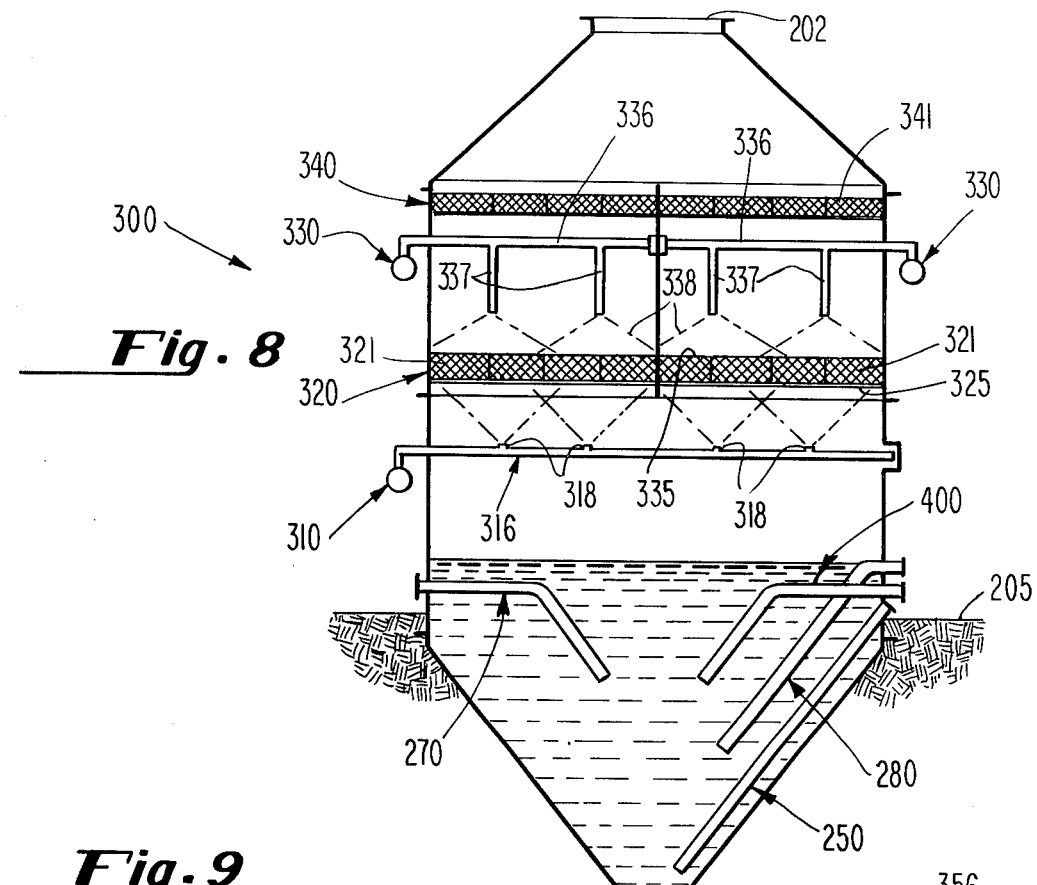

Referring now to FIGS. 7 and 8, after the gas stream is drawn through MVS module 200 it is drawn into SME module 300 which is disposed above MVS module adjacent to housing outlet 202 and over liquor filled sump 220. MVS 300 has two outwardly opening service doors; door 294 for servicing the downstream surface of first media means 320, and door 290 for servicing nozzles 337 which flush the downstream surface of media means 320. The gas stream passes through first media means 320 which contains an interlaced woven polypropylene monofilament media which is disposed perpendicularly to the gas stream. This media is designed to provide excellent break up of a liquid phase while providing maximum surface area for mass transfer with a vapor phase.

Figure 9:
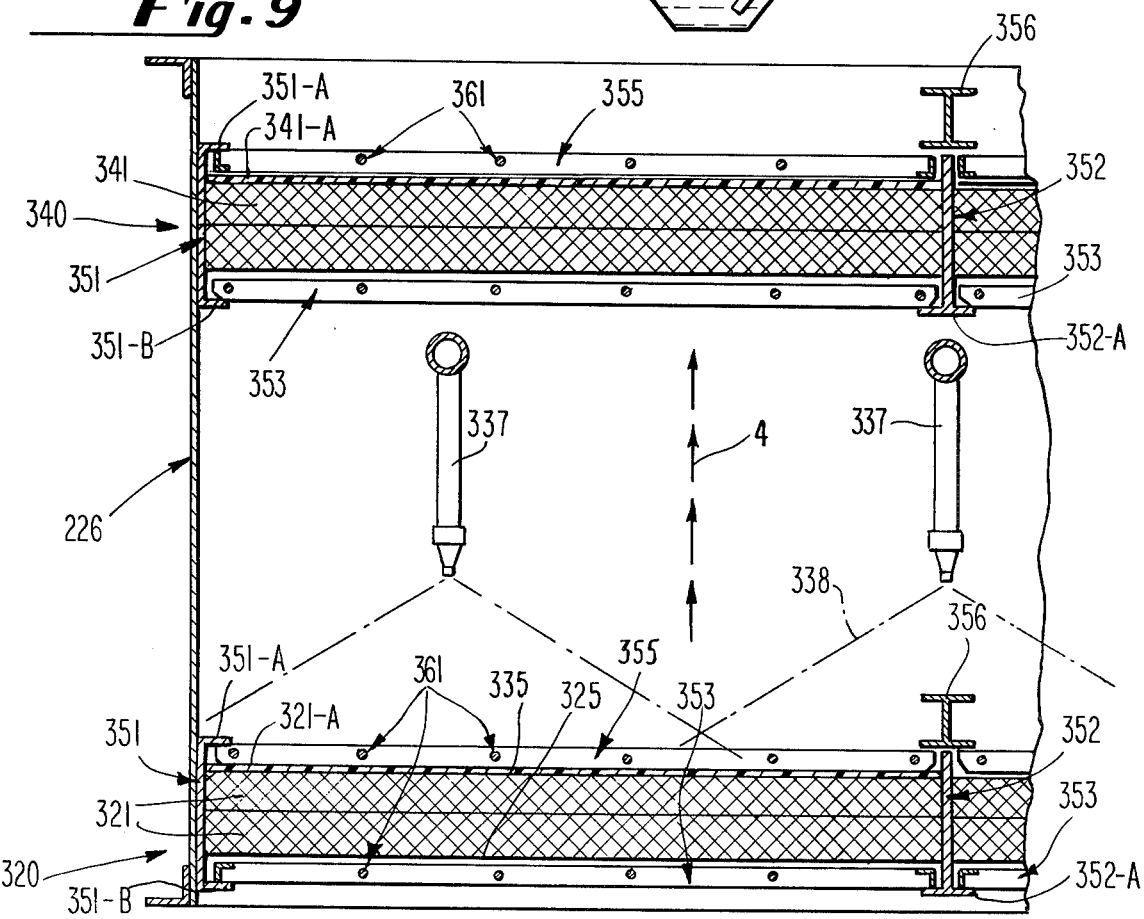

Referring now to FIG. 9, first media means 320 and second media means 340 include media 321 and 341, respectively, both of these media are similarly supported, and accordingly, the description of the structure with respect to first media means 320 will be understood to apply equally to second media means 340. A pair of "C" brackets 351 are disposed on wall portions 226 and opposed housing wall 211 (not shown in FIG. 9). Disposed between brackets 351 is support "T" 352, which is welded to and supported by front and back walls (not shown) of housing 210. Two lower media supports 353 are supported by lower "C" portion 351-B and "T" portion 352-A respectively. Lower media grill 353 is rectangularly shaped and consists of an outer support frame which extends around the perimeter of generally rectangular shaped grill 353. Lower media grill 353 provides a rigid frame which is supported by "C" brackets 351 and support "T" 352. The central portion of grill 353 is generally open to permit free passage of the gas stream. Dowels 361 pass through grill 353 and through the opposed side of the frame (not shown). In fact, dowels 361 pass lengthwise and widthwise through grill 353 to form a cross-hatched support for media 321. Lower MEM 321 is thusly supported by dowels 361 as shown in FIG. 9. Media retaining grill 355 is constructed as set forth above with respect to media support grill 353 and is positioned to retain lower MEM 321 which tends to be forced upward by the flow of the gas stream, indicated by arrows 4. Media retaining grill 355 is held in place by upper "C" bracket portion 351-A and media retaining bar 356. Media retaining bar 356 may be removed, allowing disassembly and/or service of first media means 320.

Referring now to FIGS. 8 and 9, and to the preferred embodiment of the invention, lower MEM manifold feed 310 feeds liquor to three spray bars 316 each of which in turn feed four nozzles 318. Upper MEM manifold 330 feeds liquor to three spray bars 336 disposed over two sets of media supported by grill 353. Spray bars 336 each feed four countercurrent nozzles 337. First media means 320 contains sixteen filter media pads 321.

Media pad 321 has an upstream surface 325 and downstream surface 335. First media spray means 310 irrigates upstream surface 325, providing a cocurrent spray of liquor as indicated by dashed lines 317. The function of first media spray means 310 is to provide extra liquor to flush upstream surface 325 of first media means 320, which prevents contaminant build up on upstream surface 325. Second media spray means 330 washes downstream surface 335 of first media means 320, providing a countercurrent spray of liquor as indicated by dashed lines 338. The function of second spray system 330 is to provide a spray of liquor flowing down through first media means 320 which provides a maximum surface area for mass transfer with collection of gaseous contaminant.

In operation of the device, as thusfar described, the gas stream having been treated in MVS module 200 now comprises small nucleated contaminants, gaseous contaminants, and entrained liquor carryover. The resulting gas stream is drawn through first media means 320 which collects the small nucleated contaminant and returns it to MVS module 200. The resulting gas stream now comprises entrained liquor carryover. This gas stream is then drawn through second media means 340 disposed in SME module housing 300 above first media means 320 and adjacent to outlet 202 for eliminating entrained liquor carryover from the gas stream.

Second media means 340 contains a fine mesh media which removes fine water mist from the gas stream and drains it onto first media means 320. Second media means 340 is a very high efficiency mist elimination and/or coalescing material. In the preferred embodiment, the velocity of the gas stream flowing through SME module 300 is controlled. It has been found that a threshold velocity must be attained to maximize collection in the SME. For example, if the gas stream velocity is too low, the contaminants migrate through the media; if the gas stream velocity is too high, the contaminants do not sufficiently interact with the media and are therefore not collected. It has been found that the gas stream velocity through SME module 300 should be in the range of about 480 to 630 feet per minute, and optimally from about 50 to 550 feet per minute.

The above gas stream velocity in SME module 300 is controlled by effectively blocking the passage of the gas stream through selected media pads 321 and 341 by inserting a nonporous plate 321-A and 341-A, as in FIG. 10, of the same relative size as media pads 321, beneath selected media retaining grills 355. The nonporous plate is made of a material which will not permit the gas stream to flow therethrough, such as metals, wood, plastic and the like.

The pollution control system of the present invention, as thusly described has efficiently collected the airborne contaminants from a gas stream which is passed into the atmosphere through a stack (not shown).

In certain applications dealing with hazardous materials, valuable product for extremely high number count stream, it becomes necessary to provide an additional module for containment of extraneous submicron contaminant which may be included in the resulting gas stream after it is passed through SME module 300.

This instance, an aerosol eliminator module ("AEM") 500, (FIG. 11) is provided subsequent to SME module 300 and prior to the gas streams entry into forming fan. The AEM module, for this application, contains cartridges of a densely packed, homogeneous, micron size fiber, referred to as "submicron aerosol collector" ("SMAC") which is capable of extremely high particle size retention and efficiencies, while providing for continuous drainage and extended useful life.

In the preferred embodiment, the present invention has been found to be effective to treating airborne contaminants in a gas stream at grain loadings of from 0.02 to 1.25 grains per dry standard cubic foot; with treatment of small particle size ranges of about 0.50 microns and less with 98 percent efficiency by number count; with particle populations in the order of $10^{10}$ particles per standard cubic foot; where the contaminant may include phenols, urea, formaldehyde, oils, phenol formaldehyde, inorganics, related combustion products, hydrocarbons, florides, and chlorides; with a minimum pressure drop in the range from about 6 to 14 inches of water; with efficient nucleation mechanism providing a mean diameter shift of from 0.25 to greater than 8.0 microns; and with an instantaneous mass shift of from 200 to 300 percent.

It will be apparent from the foregoing that the apparatus and method in accordance with the present invention, including any combinations of the above described components and/or embodiments, will accomplish the ends thereof, in a highly efficient manner.

It will also be apparent that various modifications may be made in the details of construction, as well as in the use and operation of the apparatus and methods of the present invention, all within the spirit and scope of the invention as defined in the appended claims.

What is claimed is:

1. In a pollution control apparatus for treating airborne contaminants in a gas stream which are emitted from the forming section of an apparatus for the manufacture of fiberglass, said gas stream comprising nucleated contaminants, gaseous contaminants, entrained liquor carryover and extraneous submicron contaminants, said pollution control apparatus having a housing having a gas inlet and a gas outlet, a liquor-filled sump portion in said housing forming a sump liquor surface, and a fixed venturi portion which together with said liquor surface define a passageway for said gas stream, the improvement which comprises:
    a first media means disposed in said passageway adjacent said gas outlet for collecting nucleated contaminant and said gaseous contaminant, said first media means having an underside and a top portion;
    first media spray means for irrigating said underside of said first media means by providing a cocurrent spray;
    second media spray means for washing said top portion of said first media means by providing a countercurrent spray;
    second media means disposed in said passageway subsequent to said first media means and adjacent said gas outlet for collecting entrained liquor carryover from said gas stream; and
    means for regulating the velocity of said gas stream through said first and second media means, wherein said velocity of said gas stream is in the range of about 480 to 630 feet per minute.

2. In an apparatus for treating airborne contaminants in a gas stream as in claim 1, further including a conduit in communication with said outlet of said housing, the improvement wherein a third media means is arranged subsequent to said second media means in said conduit for collecting extraneous submicron aerosols.

3. An apparatus for treating airborne contaminants as in claim 1, further comprising media means support assembly for anchoring said first and second media means in said passageway said first and second media means removable filter pads and said support assembly comprises:
    fourth means for supporting and retaining said filter pads in said passageway and said fourth means allowing substantially uninhibited flow of said gas stream;
    fixed support means secured to said housing for supporting and retaining said fourth means; and
    adjustable support means for supporting and retaining said fourth means, said adjustable support means having stationary means secured to said housing for supporting said filter pads and movable means cooperating with said stationary means for retaining said fourth means and being displaceable permitting removal of said fourth means for servicing of said media support assembly.

4. A media support assembly for anchoring removable media pads in an air pollution control system as in claim 3, wherein said movable means includes:
    an outer frame having two pairs of opposed side portions for communication with said fixed support means and said adjustable support means, said outer frame having paired openings in each of said respectively paired opposed side portions; and protrusions communicating with said opposed paired openings wherein said protrusions support and retain said media pads.

5. A media support assembly for anchoring removable media pads in an air pollution control system as in claim 3 wherein said fixed support means include a plurality of "C" shaped portions.

6. A media support assembly for anchoring removable media pads in an air pollution control system as in claim 3, wherein said stationary means include a plurality of "T" shaped support portions.

7. A media support assembly for anchoring removable media pads in an air pollution control system as in claim 6, wherein said movable means includes a plurality of "I" shaped retaining portions.

8. An apparatus for treatment of airborne contaminants emitted from the forming section during the manufacture of fiberglass wherein said airborne contaminants from said forming section are carried in a gas stream which comprises submicron particulate contaminant and gaseous contaminant, comprising:
a source conduit positioned near said forming section;
forming fan means for drawing said gas stream into said source conduit and moving said gas stream through said apparatus;
an inline convergence tube communicating with said source conduit and including an inlet conduit having a generally cylindrical inlet portion and a second subsequent portion of reduced diameter, a third portion contoured to communicate with said cylindrical inlet portion and said second subsequent portion, a fourth subsequent portion having substantially the same diameter as said cylindrical inlet portion and providing an outlet for said gas stream, a fifth portion contoured to communicate with said second subsequent portion of said fourth subsequent portion, and first and second means comprising first and second liquor spray means arranged in said cylindrical inlet portion and in said fourth subsequent portion, respectively, for contacting an aerosol screen of highly concentrated fine droplet spray of liquor with said gas stream in a direction countercurrent to that of said gas stream at a generation velocity in the range of about 5,000 to 15,000 feet per minute, and said forming fan means moves said gas stream and airborne contaminants through said cylindrical inlet conduit portion of said inline convergence tube at a rate in the range of 2,500 to 5,000 feet per minute, whereby said inline convergence tube nucleates said airborne contaminants, said airborne contaminants now comprising large nucleated contaminants, other remaining nucleated contaminants, gaseous contaminants, and entrained liquor carryover;
a housing having a gas inlet and a gas outlet, said inlet in communication with said fourth portion of said inline convergence tube;
a modified venturi sump means for collecting said large nucleated contaminant and for providing a liquor filled reservoir in said housing;
first media means disposed in said passageway adjacent said gas outlet for collecting said other remaining nucleated contaminants and gaseous contaminants, said first media means having an underside and a top portion;
first media spray means for irrigation of said underside of said first media means by providing a cocurrent spray;
second media spray means for washing said top portion of said first media means by providing a countercurrent spray;
second media means disposed in said passageway subsequent to said first media means and adjacent said outlet for collecting entrained liquor carryover; and
means for regulating the velocity of said gas streams through said first and second media means wherein said velocity of said gas stream is in the range of about 480 to 630 feet per minute.

9. In an apparatus for treating airborne contaminants in a gas stream as in claim 8, the apparatus comprises a plurality of inline convergence tubes connected in series.

10. In an apparatus for treating airborne contaminants in a gas stream as in claim 8, wherein said apparatus includes a plurality of said inline convergence tubes in communication with said source conduit.

11. An apparatus for treatment of airborne contaminants emitted from the forming section during the manufacture of fiberglass as in claim 8, wherein said apparatus comprises four inline convergence tubes each communicating with said source duct and said inlet of said housing.

12. An apparatus for treatment of airborne contaminants as in claim 8, wherein said third portion defines a section having converging outer surfaces which when projected toward said fifth portion form an included angle of from about 5 to 15 degrees and said fifth portion defines a section having converging outer surfaces which when projected toward said third portion form an included angle of from about 15 to 25 degrees.

13. A method for treating airborne contaminants in a gas stream comprising submircron contaminants comprising the steps of:
(a) moving the airborne contaminants in said gas stream through a conduit to attain a predetermined velocity;
(b) nucleating said airborne contaminants by contacting a screen of highly concentrated fine droplet spray of liquor with said gas stream in said conduit, said droplets having a minimum generation velocity of at least about 5,000 feet per minute in a direction countercurrent to said gas stream,
(c) increasing the velocity of the contacted gas stream in step (b);
(d) maintaining said increased velocity for at least a finite period of time; and
(e) decreasing the velocity of the resultant gas stream after step (d) by a predetermined amount and then repeating step (b).

14. A method of treating airborne contaminants in a gas stream as in claim 13, wherein said highly concentrated fine droplet spray of liquor has a droplet size distribution by number count in the range from about 50 to 400 microns wherein the population of droplets is about $10^{11}$ to $10^{13}$ droplets generated per minute.

15. A method of treating airborne contaminants in a gas stream as in claim 13, wherein ordered steps (b) through (e) are repeated at least once.

16. A method of treating airborne contaminants in a gas stream as in claim 13, said gas stream additionally including gaseous contaminants, wherein said aerosol flux of said screen is in the range of about $10^{11}$ to $10^{13}$ droplets per minute per square foot.

17. A method for treating airborne contaminants comprising submircon contaminants as in claim 13, wherein said finite period of time is at least about 5 milliseconds.

18. A method of treating airborne contaminants in a gas stream comprising submicron contaminants as in claim 13, wherein said minimum generation velocity of said fine droplet spray of liquor is in the range of from about 5,000 to about 15,000 feet per minute.

19. A method of treating airborne contaminants in a gas stream comprising submicron contaminants as in claim 13, wherein the preferred range of said minimum generation velocity is from about 6,500 feet per minute to about 13,000 feet per minute.

20. A method of treating airborne contaminants in a gas stream comprising submicron contaminants as in claim 13, wherein said airborne contaminants in said gas stream are moved through said conduit in the range of from about 2,500 to about 5,000 feet per minute.

21. A method for treating airborne contaminants in a gas stream as in claim 18, further including the step of:
    (f) passing said resultant gas stream of step (e) through a modified venturi sump with a liquor reservoir.

22. A method for treating airborne contaminants in a gas stream as in claim 21, further including the step of:
    (g) passing said resultant gas stream of step (f) through a filtering media having bottom and top portions, said bottom portion washed by cocurrent sprays, said top portion washed by countercurrent sprays.

23. A method for treating airborne contaminants in a gas stream as in claim 22, wherein said gas stream is passed through said filtering media at a velocity in the range from about 480 to 630 feet per minute.

24. A method for treating airborne contaminants in a gas stream as in claim 22, further including the step of:
    (h) passing resultant gas stream of step (g) through a high efficiency mist eliminator.

25. In a method of treating airborne contaminants in a gas stream comprising submicron emissions from a forming section of an apparatus for the manufacture of fiberglass wherein a pollution control apparatus operates in conjunction with said apparatus for the manufacture of fiberglass, said apparatus for the manufacture of fiberglass including supply means for supplying wash water to said forming section of said apparatus for the manufacture of fiberglass, said pollution control apparatus having a source conduit positioned near said forming section, forming fan means for drawing said gas into said source conduit and moving said gas stream through said apparatus, an inline convergence tube communicating with said source conduit, first means comprising first liquor spray means arranged in said inline convergence tube for contacting an aerosol screen of highly concentrated fine droplet spray of liquor with said gas stream in a direction countercurrent to that of said gas stream, and wash water feed means communicating with said supply means for supplying wash water from said apparatus for manufacture of fiberglass to said first means, comprising the steps to be performed within said inline converge tube of:
    (a) moving said airborne contaminants in said gas stream through said inline convergence tube at a predetermined velocity;
    (b) nucleating said airborne contaminants by contacting said aerosol screen of highly concentrated fine droplet spray of liquor with said gas stream in said inline convergence tube, said aerosol screen of highly concentrated fine droplet spray of liquor comprising said wash water with suspended solids in the range from about 0.2 to 2.0 percent, said droplets having a minimum generation velocity of at least about 5,000 feet per minute in a direction countercurrent to said gas stream;
    (c) increasing the velocity of said contacted gas stream in step (b);
    (d) maintaining said increased velocity for at least a finite period of time; and
    (e) decreasing the velocity of the resultant gas stream after step (d) by a predetermined amount and then repeating step (b).

* * * * *

UNITED STATES PATENT OFFICE
CERTIFICATE OF CORRECTION

Patent No. 4,153,432　　　　　　　Dated May 8, 1979

Inventor(s) Donald K. Beman, et al.

It is certified that error appears in the above-identified patent and that said Letters Patent are hereby corrected as shown below:

<u>35 U.S.C. 254</u>

In Column 5, line 36 after the word "the" delete "zig-gag" and insert therefore -- zig-zag --

In Column 6, line 68 after the word "then" delete "contacts" and insert therefore -- contacted --

In Column 8, line 39 after the word "of" delete "ICYT" and insert therefore -- ICT --

In Column 13, line 19 after the word "pads" and before the word "beneath" "321" should read -- 321 and 341 --.

<u>35 U.S.C. 255</u>

In Column 18, line 14 after the word "convergence" delete "tuble" and insert therefore -- tube --

Signed and Sealed this

Sixteenth Day of October 1979

[SEAL]

Attest:

RUTH C. MASON
Attesting Officer

LUTRELLE F. PARKER
Acting Commissioner of Patents and Trademarks